United States Patent [19]

Staub

[11] Patent Number: 5,277,082
[45] Date of Patent: Jan. 11, 1994

[54] GUIDE SHOE ASSEMBLY AND METHOD OF PRODUCTION

[76] Inventor: Anthony F. Staub, 3387 Woodman Dr., Dayton, Ohio 45429

[21] Appl. No.: 918,570

[22] Filed: Jul. 22, 1992

[51] Int. Cl.$^5$ ............................................. B21K 25/00
[52] U.S. Cl. ....................................... 76/119; 29/234; 29/237; 29/280; 29/282
[58] Field of Search ...76/101.1, 119, DIG. 6; DIG. 7; 29/234, 237, 280, 282, 272

[56] References Cited

U.S. PATENT DOCUMENTS 4,653,170  3/1987  Kelson ................................ 29/234

*Primary Examiner*—Roscoe V. Parker
*Attorney, Agent, or Firm*—Jacox & Meckstroth

[57] ABSTRACT

A strip of heat activated structural adhesive film is sandwiched between two thin strips of tempered steel shim stock, and the combined strips are placed into a semi-cylindrical cavity defined by a female mold member or block. A mating male mold member or metal bar presses the strips into the cavity while the parts are heated within a heated platen hydraulic press to form a laminated curved shoe body. After the shoe body is cooled, a semi-cylindrical collar is attached by another strip of the adhesive to one end portion of the laminated shoe body and with similar mold members heated within the press. The attached collar seats within a mating recess formed within a semi-circular mounting member and is removably secured by screws to provide for conveniently replacing the shoe body.

16 Claims, 2 Drawing Sheets

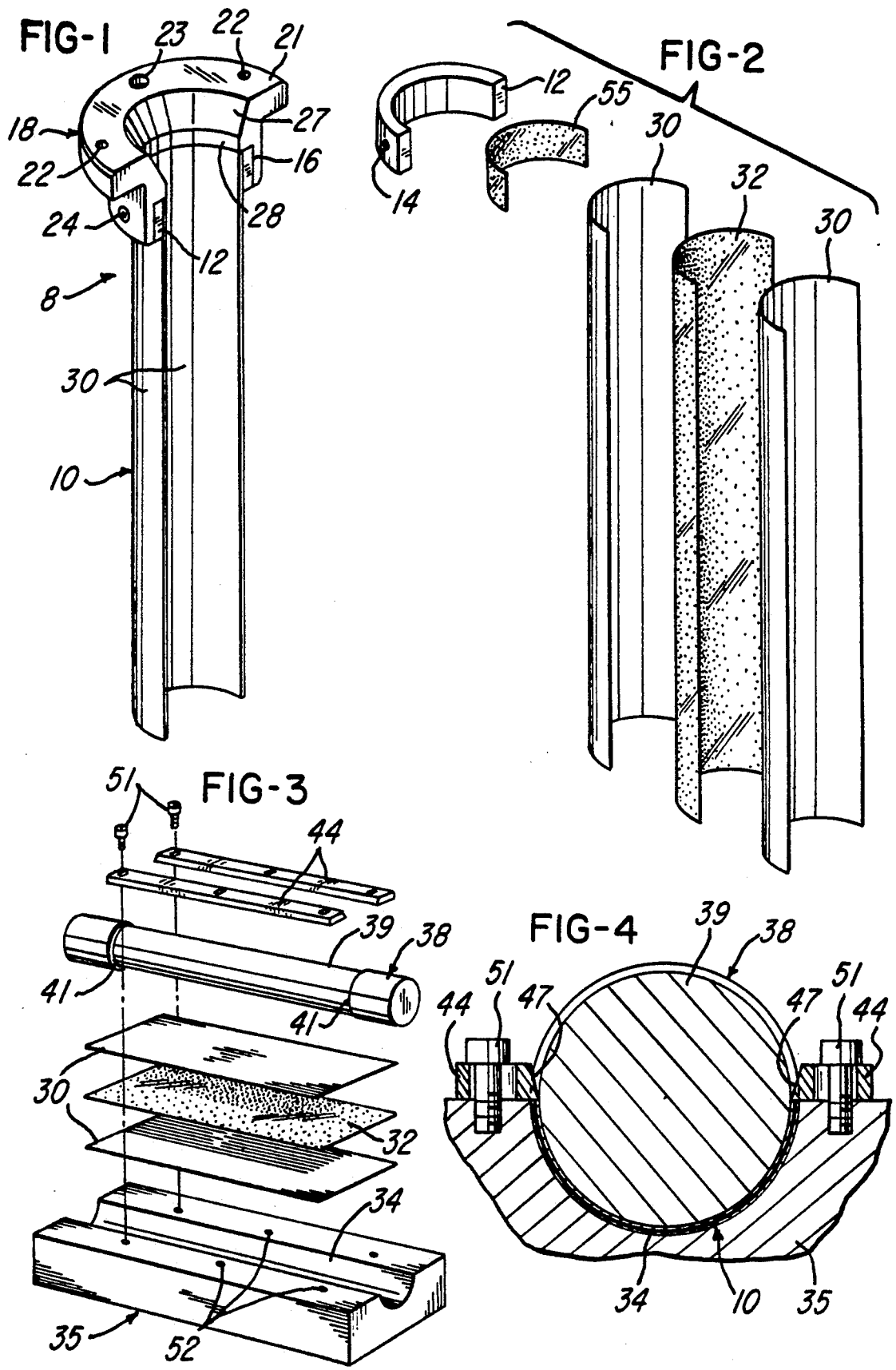

GUIDE SHOE ASSEMBLY AND METHOD OF PRODUCTION

BACKGROUND OF THE INVENTION

In the assembly of a product which forms no part of the present invention, it is necessary to insert a first cylindrical article or part into a second cylindrical or tubular article or part in close fitting relation while protecting the inner cylindrical surface of the second part. To assist in the assembly, it is known to use a pair of opposing thin semi-cylindrical shoes each constructed of stainless sheet steel or molded of composite plastics material. The opposing semi-cylindrical shoes are inserted into the second part, after which the first part is inserted between the opposing shoes. After the insertion of the first part into the second part, the pair of opposing shoes are retracted from the assembled parts. If the outer cylindrical surface of the first part and/or the inner surface of the second part is rough and abrasive, the thin shoes wear quickly and thus have a relatively short service life so that the shoes must be frequently replaced. This requires the assembly operation to be disrupted, and the replacement of the shoes significantly increases the cost of assembling the parts.

SUMMARY OF THE INVENTION

The present invention is directed to an improved guide shoe assembly and its method of production and which provides for substantially extending the service life of a guide shoe, especially when guiding an article or part having a rough and abrasive outer surface or into a part having a rough and abrasive inner surface. In accordance with one embodiment of the invention, a guide shoe assembly is formed by placing a strip of heat activated structural adhesive film between two strips of hardened or tempered steel shim stock, and the combined strips are placed within a semi-cylindrical cavity of a female mold. A steel bar or male mold presses the combined strips into the cavity, and the molds with the sandwich curved strips are heated within a hydraulic platen press so that the adhesive film positively bonds the strips of shim stock together to form a laminated semi-cylindrical shoe body. After the adhesive is cured and cooled and the shoe body is removed from the molds, a semi-cylindrical rigid collar is attached to one end portion of the laminated shoe body by another strip of the adhesive film and by a similar mold assembly. The attachment collar is removably secured within a mating recess formed in a semi-circular mounting member which has an outwardly projecting flange portion for attaching the shoe assembly to a supporting mechanism.

Other features and advantages of the invention will be apparent from the following description, the accompanying drawings and the appended claims.

BRIEF DESCRIPTION OF THE DRAWINGS

FIG. 1 is perspective view of a guide shoe assembly constructed in accordance with the present invention;

FIG. 2 is an exploded perspective view of the laminated shoe body and attachment collar shown in FIG. 1;

FIG. 3 is an exploded perspective view of the mold members and the components for producing the laminated shoe body shown in FIG. 1;

FIG. 4 is a vertical section through the assembled mold members shown in FIG. 3;

BRIEF DESCRIPTION OF THE PREFERRED EMBODIMENT

Figure 5:
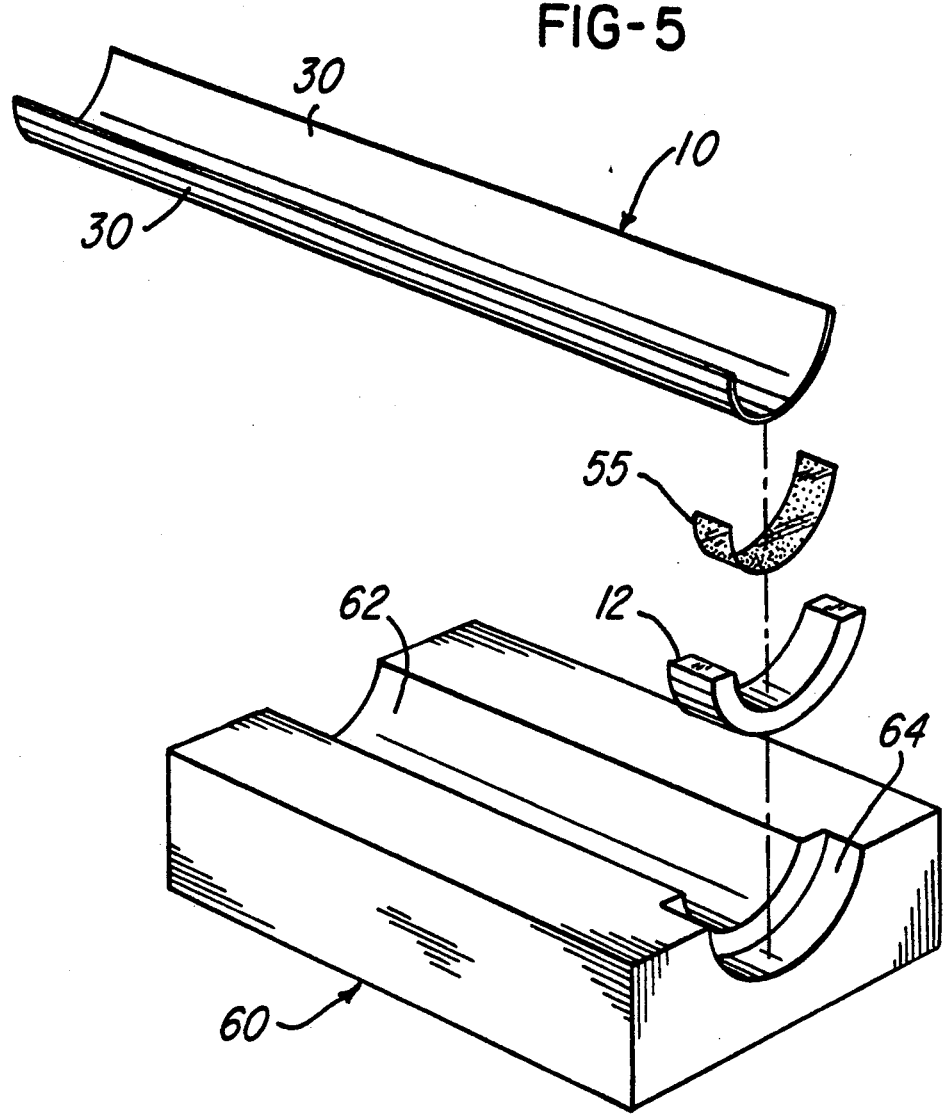
FIG. 5 is an exploded perspective view of the laminated shoe body and attachment collar shown in FIGS. 1 and 2 and showing another mold member for laminating the collar.

FIG. 1 illustrates a guide shoe assembly 8 constructed in accordance with the invention and including an elongated semi-cylindrical laminated shoe body 10 which is secured to a semi-cylindrical rigid attachment collar 12 cut from a section of steel tubing. The collar 12 has a set of three peripherally spaced threaded blind holes 14 in its outer surface and is received within a mating recess 16 formed within a semi-circular mounting member 18. The mounting member 18 has an outwardly projecting semi-circular flange 21 with peripherally spaced holes 22 and 23 for securing the mounting member 18 to a support mechanism (not shown).

A series of screws 24 extend inwardly through holes within the mounting member 18 and into the threaded holes 14 within the collar 12 for removably connecting the collar 12 and shoe body 10 to the mounting member 18. The mounting member also has a semi-circular tapered guide surface 27 which extends to a cylindrical surface 28 having a diameter slightly less than the inner diameter of the laminated shoe body 10. When the guide shoe assembly shown in FIG. 1 is used for guiding and inserting a cylindrical part into a closely surrounding cylindrical part, a pair of the guide shoe assemblies 8 are arranged and supported in adjacent opposing relation so that the two opposing shoe bodies 10 form essentially a guide tube which receives the cylindrical part to be inserted.

Referring to FIGS. 2-4, the laminated shoe body 10 includes inner and outer strips 30 of tempered steel shim stock each having a thickness of about 0.003 inch. One source of shim stock which has provided satisfactory results is manufactured by Lyon Industries and sold as Blue Tempered Shim Stock, Spring Steel C-1095. The strips 30 are prepared by washing the strips with a solution of 37% hydrochloric acid followed by a wash with a solution of 70% nitric acid and then neutralizing the acids with a bath of sodium bicarbonate. The strips 30 are then laminated together by a strip 32 of heat activated structural adhesive or epoxy film reinforced with glass fibers. One adhesive film which has provided satisfactory results is produced by 3M Company and sold as SCOTCH-WELD Structural Adhesive Film, Type AF 3109-2K. The strip has a thickness of about 0.004 inch after the lamination operation.

Referring to FIG. 3, the strip 32 of adhesive film is sandwiched between the strips 30 of tempered shim stock, and the sandwich strips are placed within a semi-cylindrical cavity 34 of a steel female mold member 35. The strips 30 and 32 are pressed into the cavity 34 by a male mold member in the form of a steel bar 38 having a center or intermediate portion 39 of slightly reduced diameter to form on each end portion an annular shoulder 41 having a radial step equal to the combined thicknesses of the strips 30 and 32 after they are laminated or a thickness of about 0.009 to 0.010 inch. The length of the intermediate portion 39 between the shoulders 41 is equal to the length of the strips 30 and 32 so that the strips are confined within a thin semi-cylindrical cavity during the laminating operation.

A cross pin (not shown) extends through an end portion of the mold member 38 and into the mold member 35 to prevent rotation of the mold member 38 which may also have a flat upper surface for engaging the upper platen of a hydraulic press. During the molding or laminating operation, the curved or semi-cylindrical strips 30 and 32 are confined within the cavity 34 by a pair rail members or bars 44 which mount on the female mold member 35 and have corresponding tapered inner surfaces 47, as shown in FIG. 4. The bars 44 are secured to the mold member 35 by a series of cap screws 51 which extend through slots within the bars and into corresponding threaded holes 52 within the mold member 35. As shown in FIG. 4, the bars 44 engage the reduced intermediate portion 39 Of the mold member 38 and confine the sandwiched strips 30 and 32 within the cavity 34, thereby preventing the strips from shifting circumferentially within the cavity 34.

After the strips 30 and 32 are confined within the mold cavity 34, as shown in FIG. 4, the assembled mold members and strips are inserted into a hydraulic platen press (not shown). The press platens are preheated to a temperature of about 250° F. and apply pressure of about 2,000 pounds against the mold members 35 and 38. As the mold members and strips are heated, the epoxy adhesive is activated to form a positive bond between the strips 30 of tempered shim stock. After the mold members and strips remain in the heated press for about 20 to 30 minutes, the parts are removed and allowed to cool to room temperature. The mold member 38 and bars 44 are removed, and the laminated shoe body 10 is removed from the cavity 34, when the shoe body springs slightly outwardly to the desired size or diameter.

Figure 6:
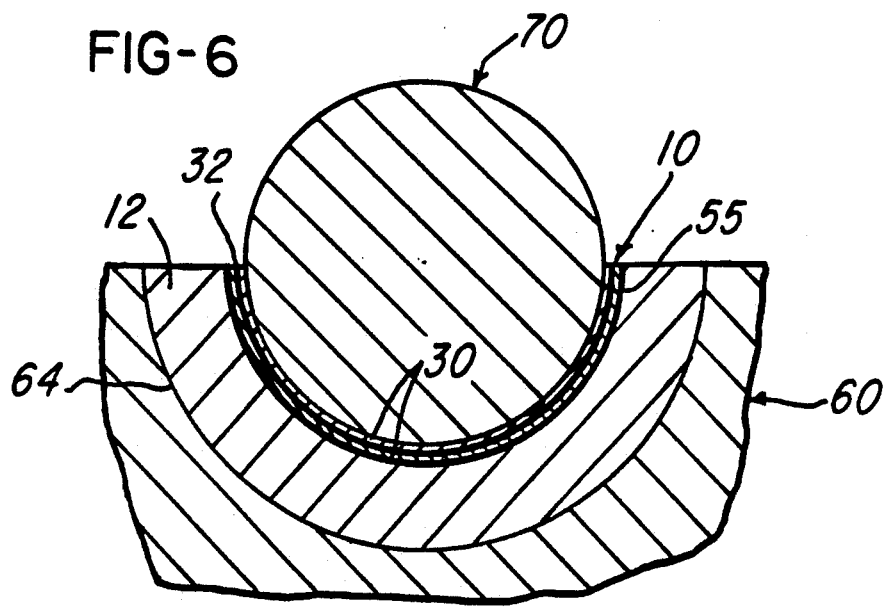
FIG. 6 is a fragmentary vertical section through the laminated shoe body and collar and through a second laminating mold assembly.

Referring to FIGS. 5 and 6, the attachment collar 12 is secured to the laminated shoe body 10 in a mold assembly similar to that disclosed above in connection with FIGS. 3 and 4. Thus a strip 55 of the same glass filled structural adhesive film described above to form the strip 32, is placed between one end portion of the laminated shoe body 10 and the inner cylindrical surface of the attachment collar 12. A female steel mold member 60 has a semi-cylindrical cavity 62 which mates with the outer surface of the shoe body 10. The mold member 60 also has a larger cavity 64 which receives the attachment collar 12 and adhesive strip 55 with the end portion of the shoe body 10 overlapping the strip 55.

A male mold member or cylindrical bar 70 is placed within the laminated shoe body 10, and the mold members 60 and 70 are compressed in the heated platen press with about 2000 pounds for about 20 to 30 minutes to activate and cure the adhesive strip 55 for positively bonding the collar 12 to the laminated shoe body 10. After the mold members 60 and 70 are removed from the press and cooled, and the sub-assembly of the collar 12 and shoe body 10 are removed from the cavities 62 and 64, the sub-assembly is attached to the mounting member 18 by the screws 24.

From the drawings and the above description, it is apparent a guide show assembly constructed in accordance with the present invention, provides desirable features and advantages. As one important advantage, a laminated shoe body 10 produced in accordance with the invention provides a substantially rigid semi-cylindrical or curved guide shoe body which is very thin, such as less than 0.010 inch, while having extremely hard inner and outer surfaces to resist abrasion and wear. In addition, the heat activated adhesive strip 32 forms a positive bond between the strips 30 of tempered shim stock and thereby maintains the semicylindrical configuration of the shoe body 10. In addition, the adhesively attached collar 12 provides for a simple connection of the shoe body 10 to the mounting member 18 while also providing for convenient removal and replacement of the shoe body 10 after an extended period of use. The mold components or members 35 and 38 and members 60 and 70 also provide for an efficient and convenient means for forming the laminated shoe body 10 and for attaching the collar 12 within a heated platen press. Thus as a result of the present invention, the guide shoe assembly 8 has a substantially longer service life and thereby significantly reduces the cost for assembling parts or components which require a pair of opposing guide shoes.

While the form of guide shoe assembly and the method of production herein described constitute a preferred embodiment of the invention, it is to be understood that the invention is not limited to the precise method and shoe assembly described, and that changes may be made therein without departing from the scope and spirit of the invention as defined in the appended claims.

The invention having thus been described, the following is claimed:

1. A guide shoe assembly adapted for use in inserting one cylindrical part into another cylindrical part in close fitting relation, comprising an elongated laminated shoe body having opposite end portions and a curved cross-sectional configuration, said body including a set of overlapping thin strips of hardened metal, a layer of adhesive material bonding said strips together over generally the overlapping area of said strips, a mounting member, and means for securing said mounting member to one of said end portions of said laminated shoe body.

2. A guide shoe assembly as defined in claim 1 wherein said securing means comprise a curved rigid attachment collar, and a layer of adhesive bonding said attachment collar to said one end portion of said shoe body.

3. A guide shoe assembly as defined in claim 1 wherein said securing means releasably secures said one end portion of said shoe body to said mounting member.

4. A guide shoe assembly as defined in claim 1 wherein said layer of adhesive comprises a heat activated adhesive film.

5. A guide shoe assembly as defined in claim 4 wherein said adhesive film is reinforced with glass fibers.

6. A guide shoe assembly as defined in claim 1 wherein said adhesive layer has a thickness of about 0.004 inch.

7. A guide shoe assembly as defined in claim 1 wherein each of said strips comprises tempered steel shim stock.

8. A guide shoe assembly as defined in claim 7 wherein each of said shim stock strips has a thickness of about 0.003 inch.

9. A guide shoe assembly as defined in claim 1 wherein said mounting member defines an arcuate recess, a curved attachment collar seated with said recess, means for removably securing said attachment collar to said mounting member, and a layer of adhesive bonding said collar to said one end portion of said shoe body, 10. A guide shoe assembly adapted for use in inserting one cylindrical part into another cylindrical part in close fitting relation comprising an elongated laminated shoe body having opposite end portions and a curved cross-sectional configuration, said body including a set of overlapping thin strips of tempered steel shim stock, a layer of fiber reinforced adhesive material bonding said strips together over generally the overlapping area of said strips, a mounting member, and means for releasably securing said mounting member to one of said end portions of said laminated shoe body.

11. A guide shoe assembly as defined in claim 10 wherein said securing means comprise a curved rigid attachment collar, and a layer of adhesive bonding said attachment collar to said one end portion of said shoe body.

12. A guide shoe assembly as defined in claim 10 wherein said layer of adhesive comprises a heat activated adhesive film.

13. A guide shoe assembly as defined in claim 10 wherein said shoe body has a thickness less than 0.010.

14. A method of making a rigid guide shoe adapted for use in inserting one cylindrical part into another cylindrical part in close fitting relation, comprising the steps of sandwiching a layer of adhesive between a set of overlapping thin flexible strips, pressing the strips with the adhesive layer therebetween into a curved cavity of a female mold member using a male mold member having a curvature generally mating with the cavity to confine the strips and adhesive layer between the mold members, curing the adhesive layer for bonding the curved strips together to form an elongated and laminated curved shoe body having opposite end portions, and attaching a mounting member to one of the end portions of the shoe body.

15. A method as defined in claim 14 wherein the layer of adhesive is heat activated, and the curing is performed by heating the mold members and strips with the adhesive layer therebetween while pressing the mold members together.

16. A method of making a rigid guide shoe adapted for use in inserting one cylindrical part into another cylindrical part in close fitting relation, comprising the steps of sandwiching a layer of heat activated adhesive between a set of overlapping thin flexible strips of tempered shim stock, pressing the strips with the adhesive layer therebetween into a curved cavity of a female mold member using a male mold member having a curvature generally mating with the cavity to confine the strips and adhesive layer between the mold members, heating the mold members to cure the adhesive layer for bonding the curved strips together to form an elongated and laminated curved shoe body having opposite end portions, and adhesively bonding a curved attachment collar to one of the end portions of the laminated shoe body.

* * * * *